United States Patent Office 3,015,061
Patented Dec. 26, 1961

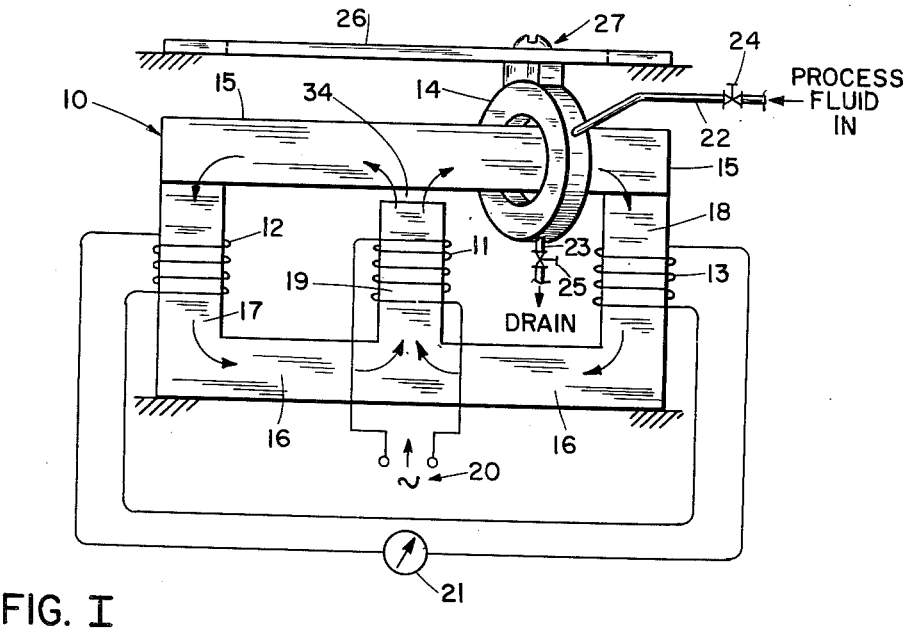
FIG. I
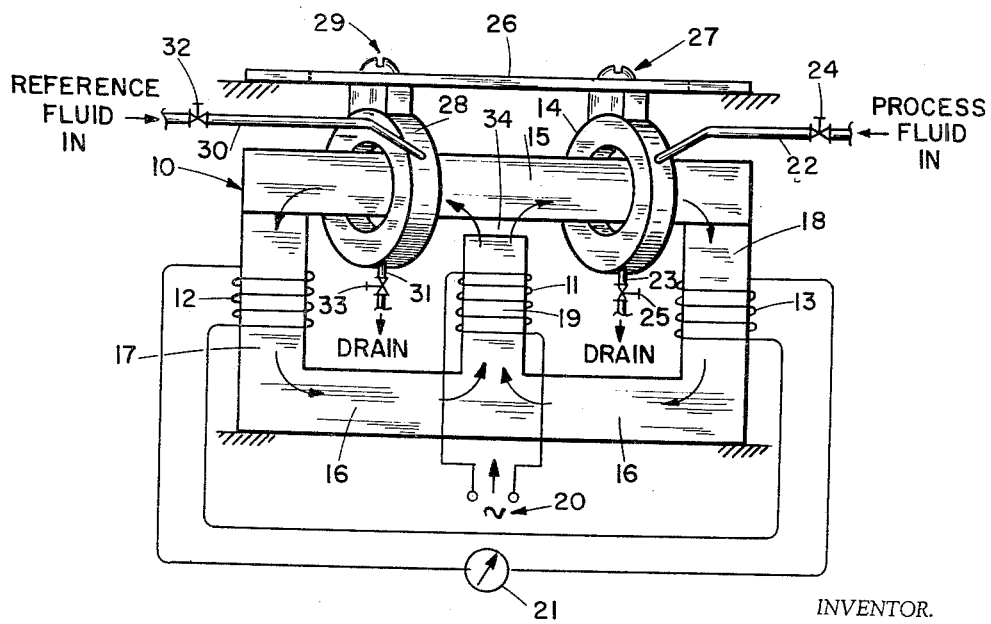
FIG. II
INVENTOR.
JAN BOEKE

3,015,061
MAGNETOMOTIVE FORCE DEVICE
Jan Boeke, Concord, Mass., assignor to The Foxboro Company, Foxboro, Mass., a corporation of Massachusetts
Filed Feb. 5, 1960, Ser. No. 7,029
1 Claim. (Cl. 324—30)

This invention relates to electro-magnetic devices, and has particular reference to the establishment and comparison of magnetomotive forces in such devices.

As an example of a use of this invention, the electrical conductivity of a fluid may be measured by establishing a body of the fluid adjacent to an alternating current energized magnetic core as an induced electrical current path. The electrical effect of this fluid on the magnet system provides a magnetomotive force condition therein which is a measure of the electrical conductivity of the fluid.

The device of this invention is applied to such measurement through the use of electrical winding on a magnetic core system with a fluid ring about the core. Thus as the conductivity of the fluid is varied, the electrical condition of the core is disturbed representatively of the conductivity change.

As an illustration, this invention provides a magnet arrangement with two magnetomotive systems. The whole arrangement is energized by alternating current, and one of the magnetomotive systems is modified in its action by the presence of a body of liquid whose electrical condition is to be measured.

A further form of this illustration provides a reference fluid to modify the action of the other of the magnetomotive systems.

It is therefore an object of this invention to provide a new and improved magnetomotive force device.

It is a further object of this invention to provide new and improved means for measuring the electrical conductivity of fluids.

Other objects and advantages of this invention will be in part apparent and in part pointed out hereinafter.

In the drawings:
FIGURE I is an illustration of the magnetomotive force device according to this invention; and
FIGURE II is an illustration of an alternative, referenced device according to this invention.

The FIGURE I showing in illustration of this invention comprises an alternating current device for the comparison of magnetomotive forces. It includes a magnetic core system 10 in the form of a horizontally disposed figure 8, with an energizing coil, magnetomotive force sensing coils 12 and 13, and an insulation ring tube 14 for containing a fluid to be measured, for example, for electrical conductivity of the fluid.

In FIGURE I the magnetic core figure 8 system has an upper cross bar 15, a lower cross bar 16, and the three vertical bars comprising a left end vertical bar 17 on which the sensing coil 12 is wound, a right end vertical bar 18 on which the sensing coil 13 is wound, and a central vertical bar 19 on which the energizing coil 11 is wound.

The energizing coil 11 is connected to an alternating current source 20. Thus alternating current energization of the energizing coil 11 sets up two magnetic flux paths in the core system 10, as indicated in one direction by sets of arrows in the figures. One such path is through the center bar 19 of the magnetic core to the right in the top cross bar 15, down through the right end vertical bar 18, and back through the lower cross bar 16 to the center vertical bar 19, and the reverse according to the alternating current. The other system is established in the same manner only to the left from the center vertical bar 19, through the top cross bar 15, down through the left end vertical bar 17, and back through the lower cross bar 16 to the center vertical bar 19 and, again, the reverse of this according to the changing direction of the alternating current energization.

Thus within the overall magnetic core system 10 there are two subsystems, one to the right and one to the left, in essentially circular closed loop fashion, with magnetic flux rising and falling and changing directions according to the energizing alternating current. These currents and their flux disposition establish magnetomotive forces which are the basis of the measurement involved in this device according to a comparison arrangement thereof which is accomplished through the sensing coils 12 and 13 on the vertical bar portions 17 and 18 of the magnetic core system. The sensing coils 12 and 13 are connected in a circuit separate from the energization circuit in series opposed relation with each other and with this circuit including an electric indicator 21. When the magnetomotive forces in the two subsystems of the magnetic core system 10 are equal the indicator 21 registers zero or a balance condition. However, when there is any difference in the magnetomotive force pattern, that is the magnetomotive force relation between the two subsystems, then this difference is indicated on the electrical indicator 21 in proportional representation thereof.

In order to use this magnetomotive force system as a basis for electrical conductivity measurement of fluids, the measurement ring device 14 is established as encircling that portion of the top cross bar 15 of the magnetic core which lies between the vertical center bar 19 and the right end vertical bar 18. That is, the tube ring 14 extends through the right hand loop of the horizontally disposed figure 8 magnetic core system. This ring 14 is a continuous circular hol'ow tube formed of insulating material so that electrical currents are not induced in the tube itself in the action of this device. Material to be measured such as an electrically conductive liquid may be entered into the tube 14 through an inlet pipe 22 and removed therefrom through an outlet pipe 23. Inlet and outlet valves 24 and 25 respectively are provided for filling and emptying or controlling the flow of fluid through the ring tube 14.

Thus an electrical conductivity measurement of a liquid may be made on a continuous flow basis or on a batch type measurement basis according to the manipulation of the valves 24 and 25. The ring 14 is indicated as being mounted on a support 26. Through a nut, bolt, and slot connection generally indicated at 27, the ring 14 may be moved in adjustment along the top cross bar 15 of the magnetic core to achieve a desired magnetomotive force arrangement prior to measurement. During such measurement the ring 14 is held in fixed position and the variant magnetomotive force differential comes from the measurement itself, for example, from changes in electrical conductivity of fluid in the ring tube 14 without any movement of the ring tube 14 itself.

The electrical current effects set up in the fluid in the tube ring 14 by the rising and falling flux in the magnet core system 10 as derived from the alternating current source 20 tend to oppose the magnetomotive force in the right hand section of the core section. This is a throttling action and as a result the magnetomotive force in the right hand portion of the core system is reduced and the magnetomotive force in the left hand portion of the core system is augmented. That is, the signal picked up by the sensing coil 13 is reduced and that picked up by the sensing coil 12 is increased and this unbalance is applied to the indicator 21 in proportional representation of the conductivity change in the fluid in the ring 14 which produced this upset. The system may be established with a particular fluid with a predetermined conductivity in the ring 14 and with its action a part of the system wherein the indicator 21 is at a balance. Thereafter a fluid of different electrical conductivity or a change in the fluid applied to the ring tube 14 produces a deviation from this balance point.

The structure of FIGURE II is identical to that of FIGURE I except for the addition of the reference ring tube 28 which is also mounted on the support 26. The reference ring tube 28 is adjustable along the support 26 in connection with a nut, bolt and slot combination indicated at 29. This reference ring tube 28 is mounted on the top cross bar 15 of the magnetic core system in the left section between the vertical bar 19 and the left hand vertical bar 17. Again adjustment of this reference ring tube 28 along this bar may be made prior to the actual measurement situation.

The reference tube 28 is provided with inlet and outlet pipes and valves as at 30, 31, 32, and 33.

During the measurement the reference ring tube 28 as well as the measurement ring tube 14 are held in fixed position and the measurement change occurs only with respect to conductivity changes of the liquid within the measurement tube 14. The reference tube 28 provides the advantage of establishing a desired starting relationship in this magnetomotive force comparison device. As a further advantage reference ring tube 28 with reference fluid therein provides a means for automatic correction for ambient temperature variations. Changes in the ambient temperature have like effects on both the measurement and the reference fluid and thus the temperature effects are cancelled out with respect to the output signal.

The magnet core system is provided with an air gap 34 between the center vertical bar 19 and the top cross bar 15. This air gap provides a high impedance factor for stability and maintains essentially constant the total flux of the system.

In operation of the device according to this invention the alternating electrical current is supplied through the energizing coil 11 and this sets up a pattern of magnetic flux variations throughout the core system 10. The effect of this magnetic flux variation on fluids in the measurement and reference rings is to induce electrical currents in the fluid rings themselves. These current changes in the fluids have back effects which aid or oppose the flux conditions in the core system 10 in a manner which is representable as magnetomotive force difference between different portions of the figure 8 core system in proportional representation of electrical conductivity changes in the fluid being measured.

This invention therefore provides a new and improved magnetomotive force comparison device and in particular a new and improved device for measuring the electrical conductivity of fluids.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A device for the measurement of electrical conductivity in fluids, wherein such measurement is accomplished by comparison of magnetomotive forces, said device comprising, in combination, a magnetic core formed as a rectangle with closed loop magnetic path continuous through said core along the sides of said rectangle, and with a central transverse core leg extending inwardly from the lengthwise midpoint of one of the long sides of said rectangle and terminating short of the other of said long sides of said rectangle to form an air gap between the free end of said transverse core leg and said other of said long sides of said rectangle, an electrically non-conductive process fluid tube formed as a closed ring encompassing said other of said long sides of said core rectangle and slidable therealong, between said transverse leg and one of the short sides of said rectangle, said ring tube being closely centered about said core to relate fluid throughout said ring tube essentially equally with respect to said core and magnetic flux about said core, an inlet tube to said ring tube, a valve in said inlet tube, an outlet tube from said ring tube, a valve in said outlet tube, whereby process fluid may be contained in said ring tube to provide for measurement of said fluid both on a batch basis and on a continuous basis, a support bar adjacent and parallel to said other of the long sides of said rectangular core, a screw and boss arrangement for mounting said process fluid ring on said support bar, and a slot in said support bar for said screw whereby said process fluid ring may be individually adjustably moved along said core, an electrically non-conductive reference fluid tube also formed as a closed ring encompassing said other of said long sides of said core rectangle and slidable therealong, between said transverse leg and the other of the short sides of said rectangle, said reference ring tube also being closely centered about said core to relate fluid throughout said reference ring tube essentially equally with respect to said core and magnetic flux about said core, a reference inlet tube to said reference ring tube, a valve in said reference inlet tube, a reference outlet tube from said reference ring tube, a valve in said reference outlet tube, whereby reference fluid may be contained in said reference ring tube to provide for reference fluid both on a batch basis and on a continuous basis, a second screw and boss arrangement for mounting said reference fluid ring on said support bar, with said second screw also in said support bar slot whereby said reference fluid ring may also be individually adjustably moved along said core, an electrical coil measurement circuit provided with a parallel arrangement of a single central coil wound on said transverse core leg in parallel with a pair of series-arranged coils, one of said pair wound on one of the short sides of said core rectangle and the other of said pair wound on the other of the short sides of said core rectangle, and an electrical indicator connected into said measurement circuit.

References Cited in the file of this patent
UNITED STATES PATENTS

| | | |
|---|---|---|
| 2,709,785 | Fielden | May 31, 1955 |
| 2,791,730 | Stout | May 7, 1957 |